United States Patent
Chen et al.

(10) Patent No.: US 9,760,793 B2
(45) Date of Patent: Sep. 12, 2017

(54) APPARATUS AND COMPUTER-IMPLEMENTED METHOD FOR GENERATING A THREE-DIMENSIONAL SCENE AND NON-TRANSITORY TANGIBLE COMPUTER READABLE MEDIUM THEREOF

(71) Applicant: HTC CORPORATION, Taiwan County (TW)

(72) Inventors: Li-Cheng Chen, Taoyuan County (TW); Huai-Che Lee, Taoyuan County (TW); Jhih-Rong Chen, Taoyuan County (TW); Yung-Chao Tseng, Taoyuan County (TW); Hsin-Ti Chueh, Taoyuan County (TW)

(73) Assignee: HTC CORPORATION, Taoyuan County (TW)

( * ) Notice: Subject to any disclaimer, the term of this patent is extended or adjusted under 35 U.S.C. 154(b) by 198 days.

(21) Appl. No.: 14/528,190

(22) Filed: Oct. 30, 2014

(65) Prior Publication Data
US 2015/0116317 A1  Apr. 30, 2015

Related U.S. Application Data

(60) Provisional application No. 61/897,516, filed on Oct. 30, 2013, provisional application No. 61/897,403, filed on Oct. 30, 2013.

(51) Int. Cl.
*G06F 17/00* (2006.01)
*G06K 9/46* (2006.01)
*H04N 13/00* (2006.01)

(52) U.S. Cl.
CPC ....... *G06K 9/4642* (2013.01); *H04N 13/0011* (2013.01); *H04N 2013/0085* (2013.01); *H04N 2013/0092* (2013.01)

(58) Field of Classification Search
None
See application file for complete search history.

(56) References Cited

U.S. PATENT DOCUMENTS

2006/0262969 A1* 11/2006 Matsumoto ............. G06K 9/34
382/131
2009/0185759 A1   7/2009 Liu et al.
2012/0013603 A1   1/2012 Liu

FOREIGN PATENT DOCUMENTS

CN          101686407 A       3/2010
CN          102404583 A       4/2012
(Continued)

OTHER PUBLICATIONS

Taiwanese First Office Action corresponding to Patent application No. 103137587, Mailing date Oct. 7, 2015, with English translation.
(Continued)

*Primary Examiner* — Said Broome
(74) *Attorney, Agent, or Firm* — Cantor Colburn LLP (57) ABSTRACT

An apparatus and computer-implemented method for generating a three-dimensional scene and non-transitory tangible computer readable medium thereof are provided. The apparatus comprises a storage unit and a processing unit. The storage unit is stored with an image and a plurality of depth data of the image. The processing unit is configured to generate a depth histogram according to the depth data, generate a region of interest of the image according to the depth histogram, decide a moving path of a virtual camera according to the region of interest, and generate the three-dimensional scene according to the image and the moving path.

11 Claims, 10 Drawing Sheets

(56) References Cited

FOREIGN PATENT DOCUMENTS

TW 200933491 A 8/2009
TW 201203172 A 1/2012

OTHER PUBLICATIONS

SIPO First Office Action corresponding to Chinese Application No. 201410598890.0; dated Mar. 13, 2017, with English translation.

* cited by examiner

| LT | | RT |
|---|---|---|
| LC | C | RC |
| LB | | RB |

APPARATUS AND COMPUTER-IMPLEMENTED METHOD FOR GENERATING A THREE-DIMENSIONAL SCENE AND NON-TRANSITORY TANGIBLE COMPUTER READABLE MEDIUM THEREOF

CROSS-REFERENCES TO RELATED APPLICATIONS

This application claims the benefit of U.S. Provisional Application Ser. Nos. 61/897,403 and 61/897,516 filed on Oct. 30, 2013, which are both hereby incorporated by reference in their entirety.

BACKGROUND OF THE INVENTION

Field of the Invention

The present invention relates to an apparatus and computer-implemented method for generating a three-dimensional scene and non-transitory tangible computer readable medium thereof; more particularly, the present invention relates to an apparatus and computer-implemented method for generating a three-dimensional scene and non-transitory tangible computer readable medium thereof based on depth data of an image.

Descriptions of the Related Art

Although images showing various kinds of contents are everywhere in our daily lives, people are still not satisfied. The main reason is that these images are two-dimensional (2D) and look flat to human eyes.

Three-dimensional (3D) images/scenes are developed by including depth information into conventional 2D images. Conventionally, a 3D image/scene is generated by the following procedures: capturing a scene from two perspectives and providing the illusion of depth by a special projection device (e.g. 3D eyeglasses). As the conventional procedure for generating 3D images/scenes is cumbersome, a convenient way for generating 3D images/scenes is still in an urgent need.

SUMMARY OF THE INVENTION

An objective of this invention is to provide an apparatus for generating a three-dimensional scene. The apparatus comprises a storage unit and a processing unit, wherein the storage unit is electrically connected to the processing unit. The storage unit is stored with an image and a plurality of depth data of the image. The processing unit is configured to generate a depth histogram according to the depth data, generate a region of interest of the image according to the depth histogram, decide a moving path of a virtual camera according to the region of interest, and generate the three-dimensional scene according to the image and the moving path.

Another objective of this invention is to provide a computer-implemented method for generating a three-dimensional scene. The computer-implemented method comprises the steps of generating a depth histogram according to a plurality of depth data of an image, generating a region of interest of the image according to the depth histogram, deciding a moving path of a virtual camera according to the region of interest, and generating the three-dimensional scene according to the image and the moving path.

Yet a further objective of this invention is to provide a non-transitory tangible computer readable medium, which is stored with a computer program. The computer program executes a method for generating a three-dimensional scene after being loaded into an electronic apparatus. The method for generating the three-dimensional scene comprises the steps of generating a depth histogram according to a plurality of depth data of an image, generating a region of interest of the image according to the depth histogram, deciding a moving path of a virtual camera according to the region of interest, and generating the three-dimensional scene according to the image and the moving path.

The present invention generates a three-dimensional scene based on an image and the depth data of the image. The three-dimensional feeling of the three-dimensional scene is achieved by introducing a moving path of a virtual camera when generating the three-dimensional scene. The three-dimensional feeling may be enhanced by adding particles into the three-dimensional scene. To achieve that, the present invention generates a depth histogram according to the depth data, generates a region of interest of the image according to the depth histogram of the image, decides the moving path of the virtual camera according to the region of interest, and generates the three-dimensional scene according to the image and the moving path. Particles in appropriate size(s) may be further added to the three-dimensional scene. By using the moving path and adding particles, parallax visual effects of the three-dimensional scene can be created and, hence, have three-dimensional feeling to human eyes.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. Nevertheless, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1:
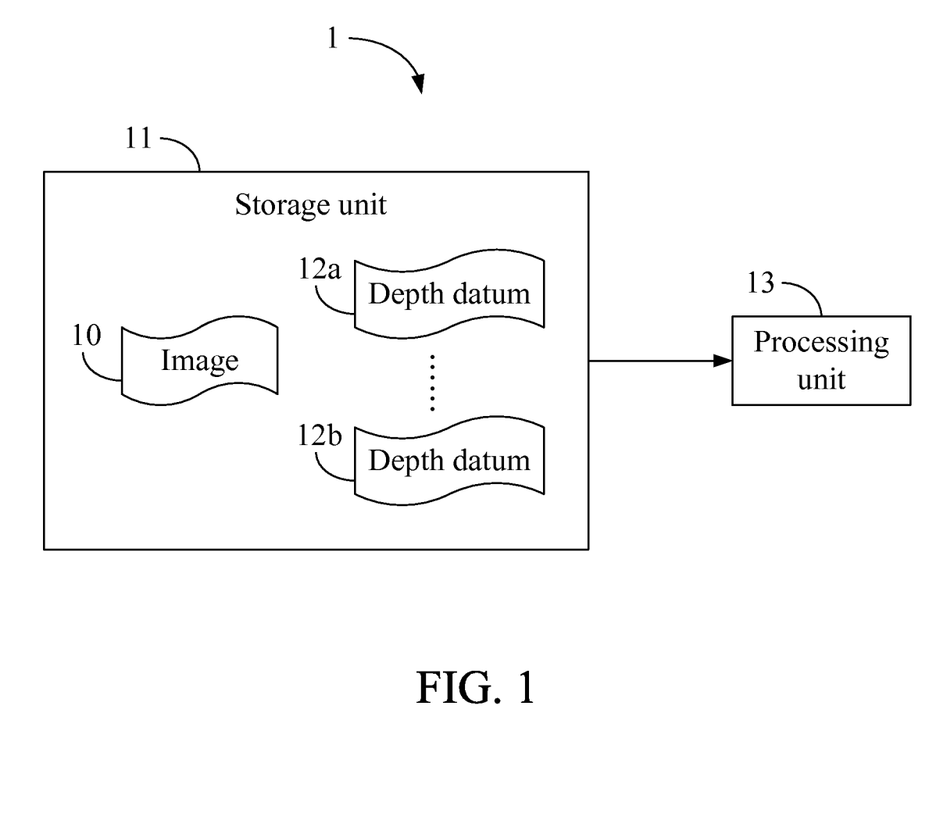
FIG. 1 illustrates a schematic view of an apparatus for generating a three-dimensional scene.

A first embodiment of the present invention is an apparatus for generating a three-dimensional scene and a schematic view of which is illustrated in FIG. 1. The apparatus comprises a storage unit and a processing unit, wherein the storage unit and the processing unit are electrically connected to each other. The storage unit may be a memory, a floppy disk, a hard disk, a compact disk (CD), a mobile disk, a magnetic tape, a database, or any other storage media or circuit with the same function and well known to those of ordinary skill in the art. The processing unit may be any of various processors, central processing units (CPUs), microprocessors, or other computing devices that are well-known by those of ordinary skill in the art.

The storage unit is stored with an image and a plurality of depth data, of the image, wherein each of the depth data corresponds to a portion (e.g. a pixel or a plurality of pixels) of the image. The image contains a scene of the real world from a viewpoint. Each of the depth data is of a depth value related to (or, equivalent to) a distance between the viewpoint and a position of the surface of the scene. The depth data may be derived in various ways, such as dual cameras, calculation of a stereo image system, and a distance measuring equipment (e.g. laser measurement equipment, infrared ray measurement equipment, etc.).

Figure 2:
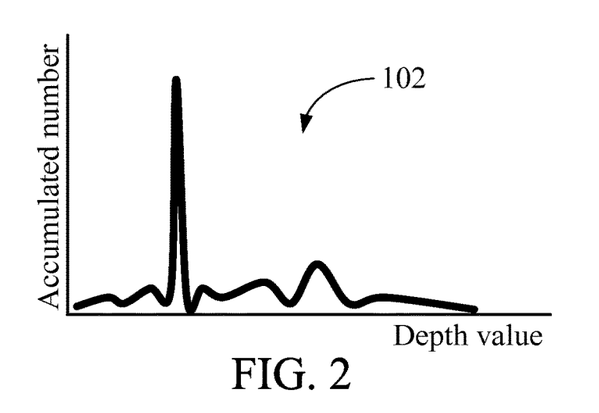
FIG. 2 illustrates a visual expression of the depth histogram.

At the beginning, the processing unit generates a depth histogram according to the depth data. The depth histogram records an accumulated number of each of the depth values. A visual expression of the depth histogram is illustrated in FIG. 2, wherein the horizontal axis represents the depth values of the depth data and the vertical axis represent the accumulated number of each of the depth values. The depth values are arranged in a decreasing manner from left to right in FIG. 2; however, depth values may be arranged in other manner in other embodiments. It is noted that the present invention does not limit the ways for visually expressing a depth histogram.

Next, the processing unit generates a region of interest of the image according to the depth histogram. In the present invention, a region of interest of an image includes pixels of the image having depth values within a depth range and gathering closely. The procedure of generating the region of interest of the image may be roughly divided into the following sub-procedures: (a) updating the depth histogram by truncating its noises, (b) updating the depth histogram again by filtering out the far-side depth data, (c) deciding a depth range according to the updated depth histogram, (d) deciding a horizontal range and a vertical range according to a depth map and the depth range, and (e) deciding the region of interest of the image 10 according to the vertical range and the horizontal range. Each of the sub-procedures will be elaborated in details below.

Figure 3:
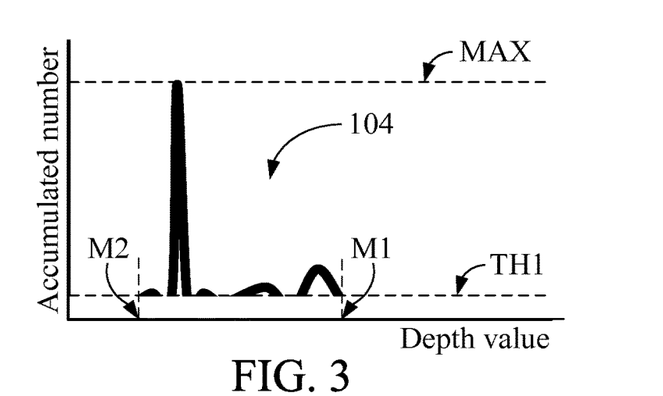
FIG. 3 illustrates the concept of truncating the noise of the depth histogram.

Regarding the sub-procedure for updating the depth histogram by truncating its noises (i.e. the above sub-procedure (a)), its concept is illustrated in FIG. 3. The processing unit figures out a maximum value among the accumulated numbers, decides a threshold according to the maximum value, and updates the depth histogram by truncating the accumulated numbers according to the threshold. For example, the threshold may be a value equivalent to a certain percentage (e.g. 5%) of the maximum value. After the execution of the sub-procedure (a), the updated depth histogram is derived. As mentioned, a region of interest of an image includes pixels of the image having depth values within a depth range and gathering closely; hence, the main objective of this sub-procedure is keeping the depth values that are significant enough (i.e. keeping the depth values whose accumulated numbers are greater than the threshold). It is noted that the sub-procedure (a) may be omitted in some other embodiments.

Figure 4:
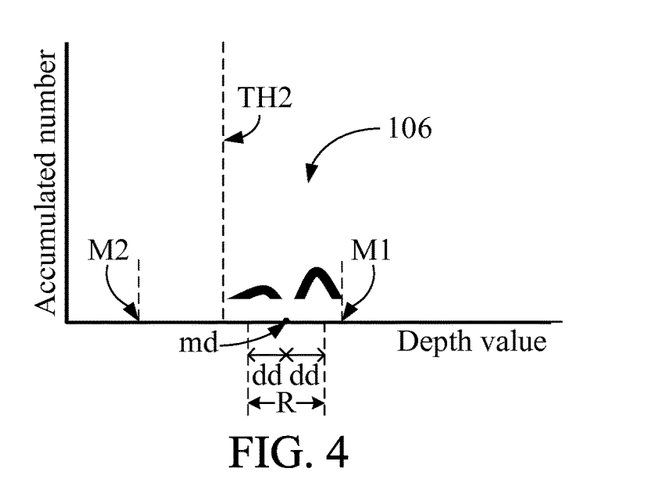
FIG. 4 illustrates the concept of filtering out the far-side depth data of the depth histogram.

After executing the sub-procedure (a), the processing unit updates the depth histogram by filtering out the far-side depth data (i.e. performs the above sub-procedure (b)). FIG. 4 illustrates the concept of the sub-procedure (b). The processing unit updates the depth histogram by filtering out the accumulated numbers corresponding to the depth values greater than a threshold. The threshold is a middle value between a maximum depth value and a minimum depth value among the depth values covered by the depth histogram. For example, the threshold may be a median value or a central value of the depth values covered by the depth histogram. After the execution of the sub-procedure (b), the updated depth histogram comprising near-side depth data is derived. The near-side depth data are kept in the depth histogram because, for most images, the interested object(s) (e.g. human face(s)) of an image is more closed to the camera than the background is when being captured.

As mentioned, the above sub-procedure (a) may be omitted in some other embodiments. For those embodiments, the processing unit will apply the sub-procedure (b) to the depth histogram instead. People ordinary skilled in the art would easily appreciate how to apply the sub-procedure (b) to the depth histogram based on the description in previous paragraph; hence, the details are not repeated again.

After executing the sub-procedure (b), the processing unit decides a depth range according to the depth values covered by the updated depth histogram (i.e. performs the aforementioned sub-procedure (c)). The depth range is a range within the range of the depth values of the updated depth histogram. In a preferred embodiment, the processing unit may decides the depth range by calculating a mean value and a standard deviation according to the depth values remained in the updated depth histogram and then calculating the depth range according to the mean value and the standard deviation. To be more specific, the depth range is from a value equivalent to the mean value minus the standard deviation to a value equivalent to the mean value plus the standard deviation.

Figure 5:
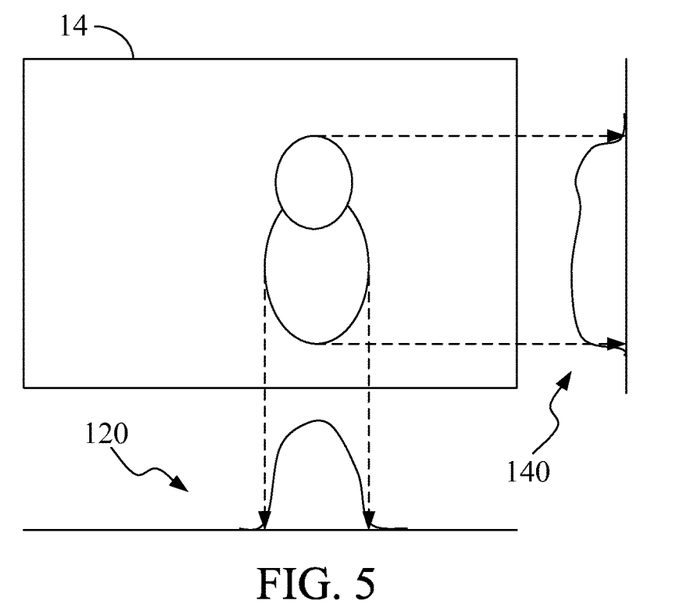
FIG. 5 illustrates the concept of deciding a horizontal range and a vertical range.
Figure 6:
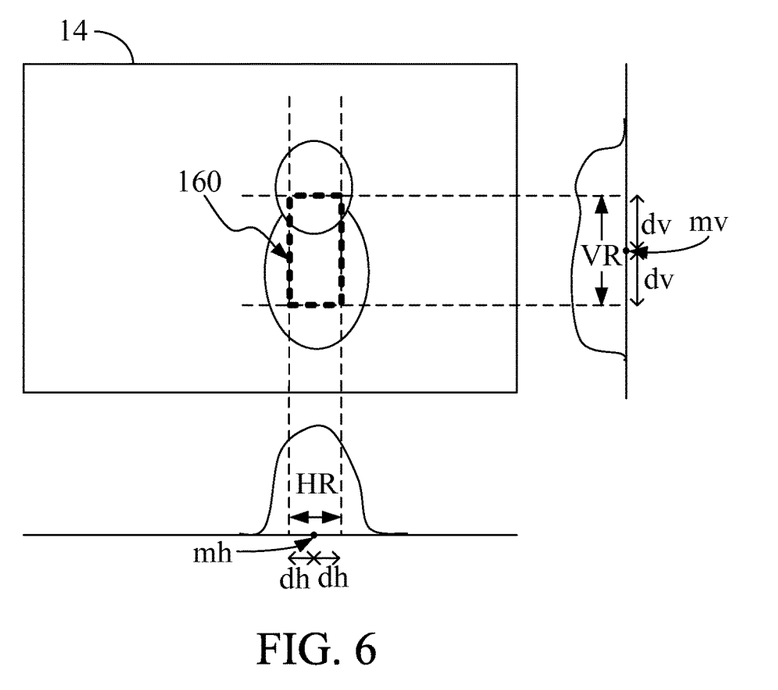
FIG. 6 illustrates the concept of deciding a horizontal range and a vertical range and generating the region of interest accordingly.

After executing the sub-procedure (c), the processing unit decides a horizontal range and a vertical range according to a depth map of the image and the depth range (i.e. performs the aforementioned sub-procedure (d)) as shown in FIG. 5 and FIG. 6. The depth map comprises the depth data; more specifically, the depth data are arranged in the depth map in a way that the depth map corresponds to the image in terms of the spatial positions. The processing unit derives a horizontal projection by projecting the depth data of the depth map whose depth value is within the depth range onto a horizontal axis. Similarly, the processing unit derives a vertical projection by projecting the depth data of the depth map whose depth value is within the depth range onto a vertical axis.

Then, the processing unit calculates the horizontal range according to the horizontal projection and calculates the vertical range according to the vertical projection. In some other embodiments, the processing unit may calculate a mean value and a standard deviation of the horizontal projection and then calculate the horizontal range according to the mean value and the standard deviation so that the horizontal range is from a value equivalent to the mean value minus the standard deviation to a value equivalent to the mean value plus the standard deviation. Likewise, in some other embodiments, the processing unit may calculate a mean value and a standard deviation of the vertical projection and calculate the vertical range according to the mean value and the standard deviation so that the vertical range is from a value equivalent to the mean value minus the standard deviation to a value equivalent to the mean value plus the standard deviation.

After executing the sub-procedure (d), the processing unit 3 decides the region of interest of the image according to the vertical range and the horizontal range (i.e. performs the aforementioned sub-procedure (e)) as shown in FIG. 6. In some embodiments, an area of the depth map that is within the range of the vertical range and the horizontal range is decided to be the region of interest of the depth map. When the resolutions of the depth map and the image are the same, the processing unit treats the region of interest as the region of interest of the image. When the resolutions of the depth map and the image are not the same, the region of interest of the image will be derived by scaling the region of interest. In this embodiment, it is assumed that the region of interest is for the image as well.

After the region of interest of the image has been generated, the processing unit decides a moving path of a virtual camera according to the region of interest. Particularly, the processing unit may decide the moving path according to a size of the region of interest, an aspect ratio of the region of interest, and/or a center of the region of interest. In some embodiments, a plurality of predetermined moving paths are defined in advance and each of them is associated with an index. For these embodiments, the processing decides an index according to a size of the region of interest, an aspect ratio of the region of interest, and/or a center of the region of interest and then selects the moving path from these of predetermined moving paths according to the index.

To be more specific, there is one predetermined moving path for the scenario that a size of a region of interest is greater than a first threshold. Hence, when the size of the region of interest is greater than the first predetermined threshold, the processing unit is able to decide the index and selects the corresponding moving path. In addition, there is another predetermined moving path for the scenario that an aspect ratio of the region of interest is greater than a second threshold. Therefore, when the aspect ratio of the region of interest is greater than the second predetermined threshold, the processing unit is able to decide the index and selects the corresponding moving path.

Figure 7:
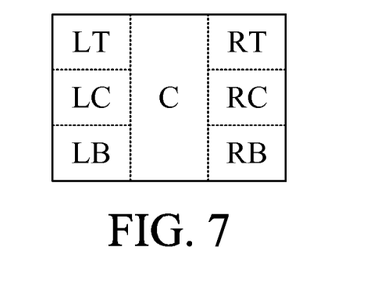
FIG. 7 illustrates the concept of virtually dividing an image into seven portions.
Figure 8:
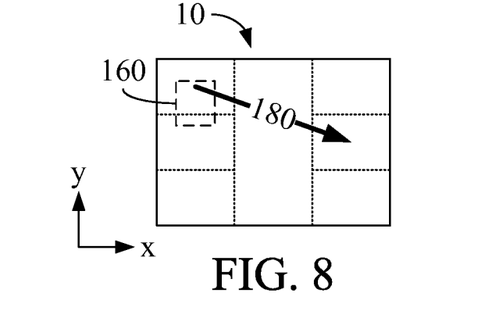
FIG. 8 illustrates a front view of an exemplary moving path.
Figure 9:
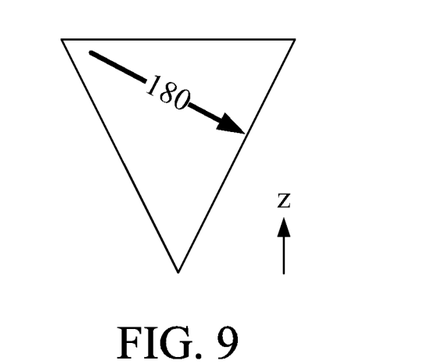
FIG. 9 illustrates a top view of an exemplary moving path.

There are also several predetermined moving paths for the scenarios that the center of the region of interest locates at different positions. To be more specific, an image is virtually divided into seven portions as shown in FIG. 7. For each of the portions, there is at least one corresponding predetermined moving path. For example, when the center of the region of interest is located at the portion LT, an exemplary moving path is illustrated in FIG. 8 and FIG. 9. FIG. 8 illustrates the front view of the moving path; hence, the horizontal (i.e. x-axis directional) and vertical (i.e. y-axis directional) movement of the moving path can be seen. FIG. 9 illustrates the top view of the moving path; hence, the depth-directional (i.e. z-axis directional) movement of the moving path can be seen.

Figure 10:
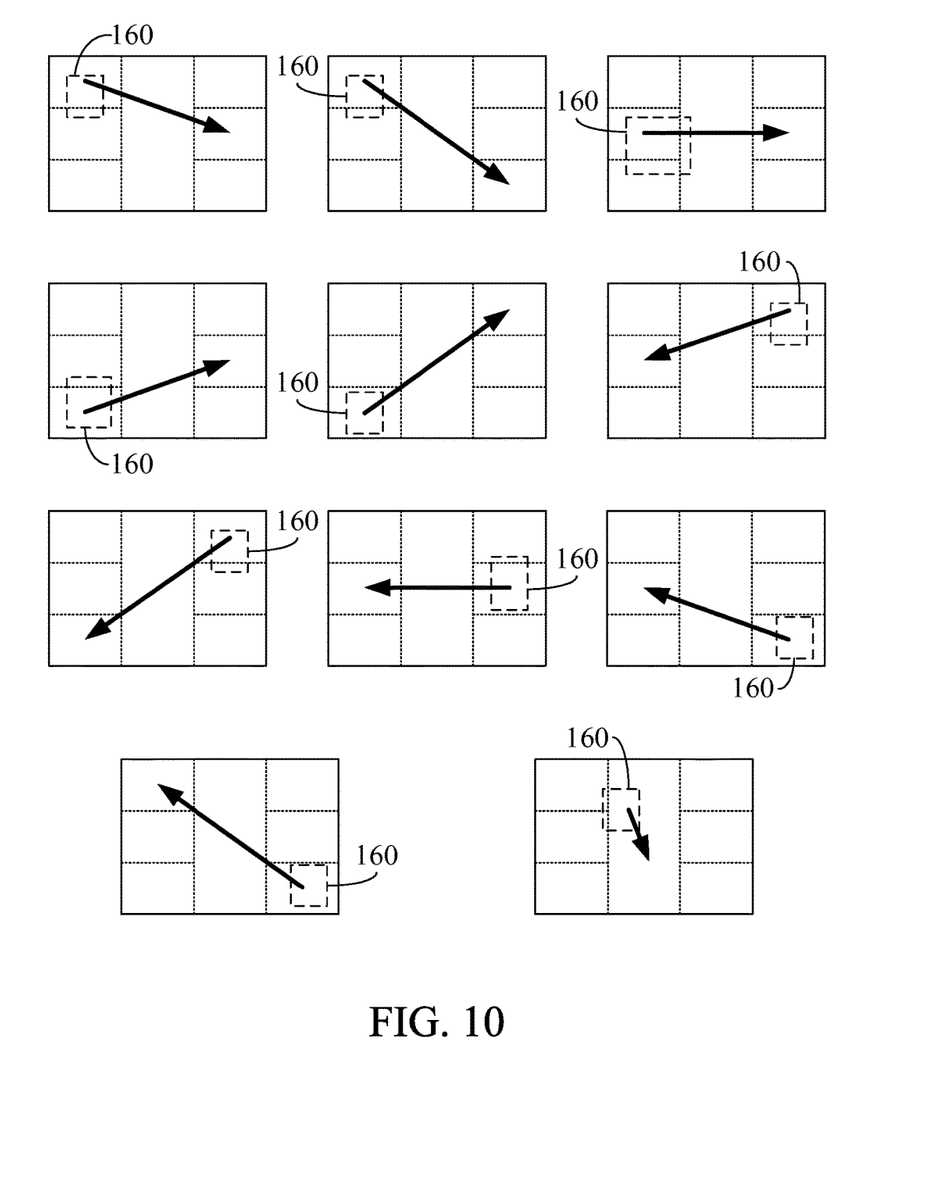
FIG. 10 illustrates several exemplary moving paths in front view.

FIG. 10 illustrates several exemplary moving paths that are defined according to the center of the region of interest in front view. To achieve better performance, when the center of the region of interest is located in any of the left portions LT, LC, LB, the moving paths are from the left portion to the right portion to create more parallax effect in the later stage. Likewise, when the center of the region of interest is located in any of the right portions RT, RC, RB, the moving paths are from the right portion to the left portion to create more parallax effect in the later stage. In addition, each of the moving paths shown in FIG. 10 also contains z-axis directional movement, which contributes to the parallax effect at a later stage.

Figure 11:
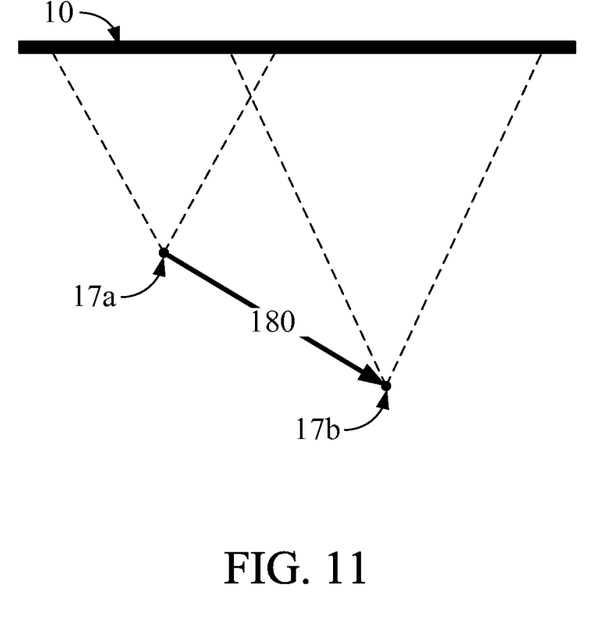
FIG. 11 illustrates the top view of the concept for generating the three-dimensional scene.

After the moving path has been decided, the processing unit generates a three-dimensional scene according to the image and the moving path (say, the moving path). Please refer to FIG. 11, which illustrates the top view of the concept for generating the three-dimensional scene. To be more specific, the moving path defines a first position 17a of a camera view and a second position 17b of the camera view. The first position and the second position of the moving path may be respectively the beginning position and the ending position of the moving path. The processing unit decides a first key frame according to the first position and the image (e.g. taking a picture of the image by a virtual camera at the first position), decides a second key frame according to the second position and the image (e.g. taking a picture of the image by a virtual camera at the second position), and then generates the three-dimensional scene by combining the first key frame and the second key frame in sequence. In some other embodiments, the processing unit may select more than two positions from the moving path and then decides more than two key frames based on the selected positions and the image and then generates the three-dimensional scene by combining all these key frames in sequence. Since the moving path traverses along three directions (i.e. x-direction, y-direction, and z-direction), the three-dimensional scene comprising the first key frames, the second key frames, and even other key frames taken from different positions of the moving path have parallax effect.

Figure 12:
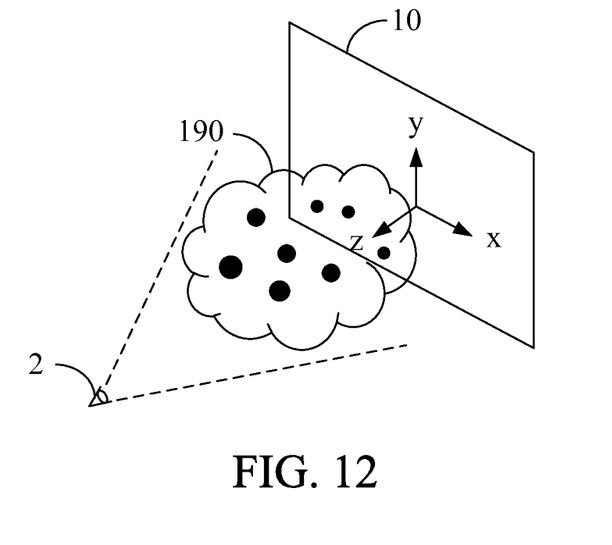
FIG. 12 illustrates the concept of adding particles into the three-dimensional scene.
Figure 13:
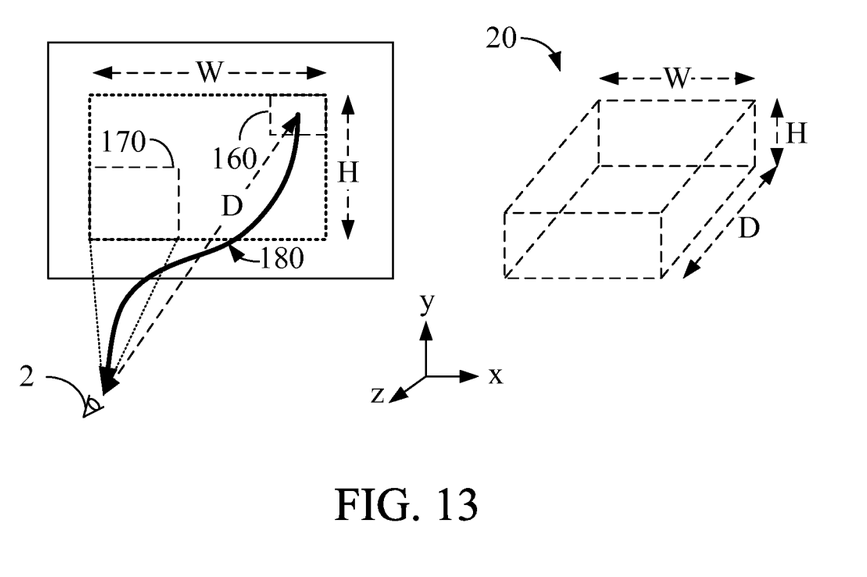
FIG. 13 illustrates the concept of deciding the three-dimensional space.

In some other embodiments, the processing unit may further add a plurality of particles (e.g. leaves, raindrops, etc.) into the three-dimensional scene to provide more parallax visual effects as shown in FIG. 12. Preferably, the virtual camera can always see the particles when moving along the moving path. To achieve that, the processing unit has to properly decide a three-dimensional space for the particles and the size of the particles. The processing unit may decide the three-dimensional space according to the region of interest and the moving path. Both the width and the height of the three-dimensional space cover the region of interest and a projection area as shown in FIG. 13. The projection area is the area seen from the moving path at the second position (e.g. the ending position) of the moving path. In addition, the depth of the three-dimensional space is the depth of the moving path along the z-axis.

Now, the detail of deciding the size of the particles is elaborated. The processing unit calculates an average depth (e.g. 1 m) according to the data values within the region of interest. Then, the processing unit calculates a size of a particle type for the three-dimensional space according to the average depth. When a particle of this particle type is placed at the average depth (e.g. 1 m), its size appears normally to human eyes. For particles that are not placed at the average depth (e.g. in front of the average depth), the processing unit will adjust the size of the particle types accordingly (e.g. by scaling the size calculated for the average depth).

When the apparatus comprises a display unit (not shown) or when the apparatus 1 is electrically connected to a display unit, the display unit will display the first key frame and the second key frame in sequence and display the particles of the size in the three-dimensional space.

According to the above description, the three-dimensional scene generated by the apparatus 1 has parallax effects because the key frames comprised in the three-dimensional scene are taken from various positions along the moving path which traverses along at least one direction (i.e. x-direction, y-direction, and/or z-direction). The parallax effects can be further enhanced by adding particles to the three-dimensional scene. With the parallax effects, the three-dimensional scene has three-dimensional feeling to human eyes.

Figure 14A:
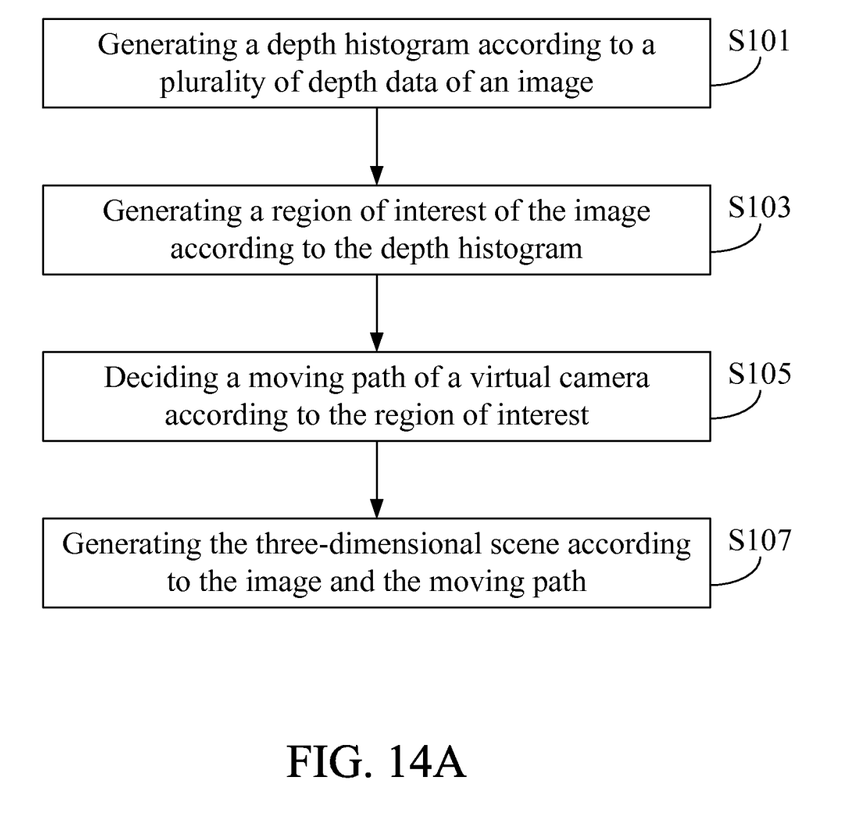
FIGS. 14A, 14B, and 14C illustrate the flowchart of the computer-implemented method for generating a three-dimensional scene.
Figure 14B:
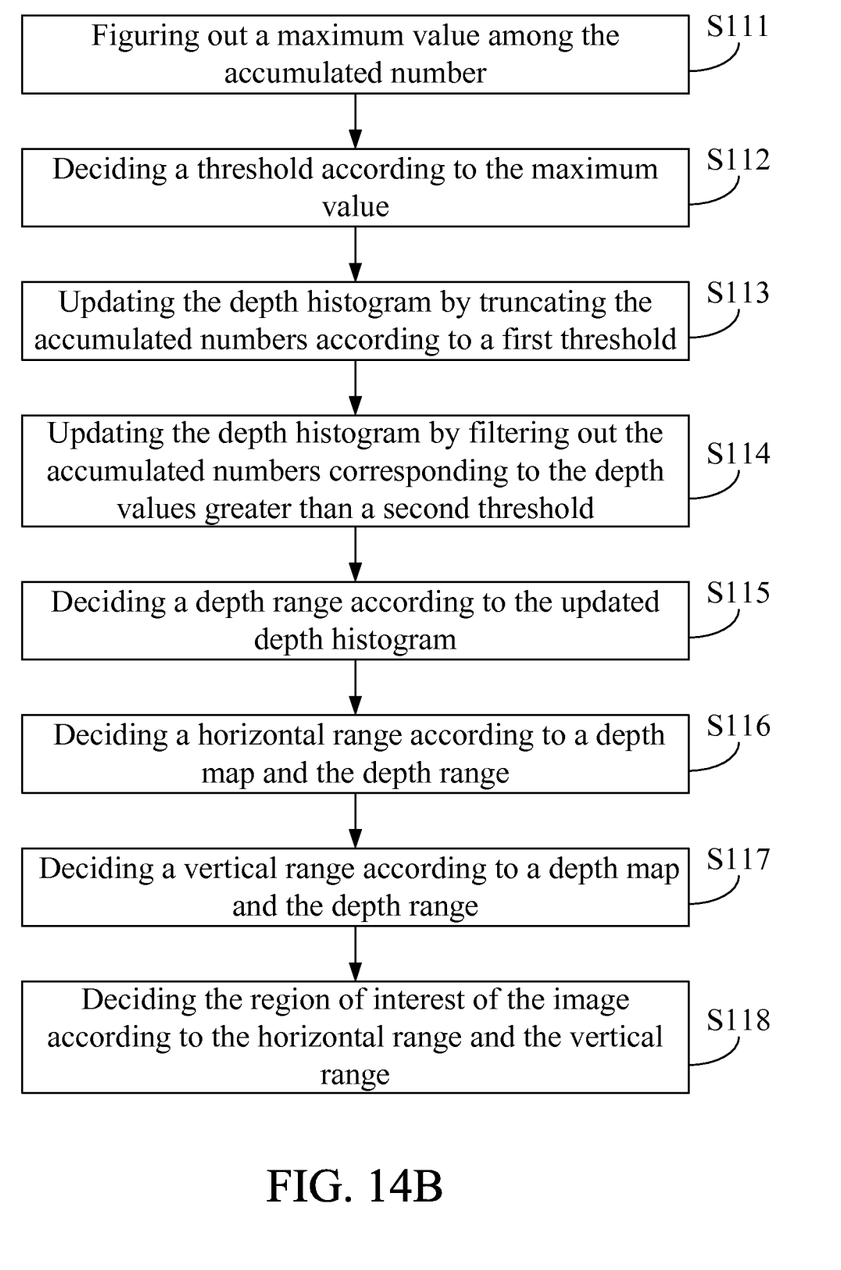
Figure 14C:
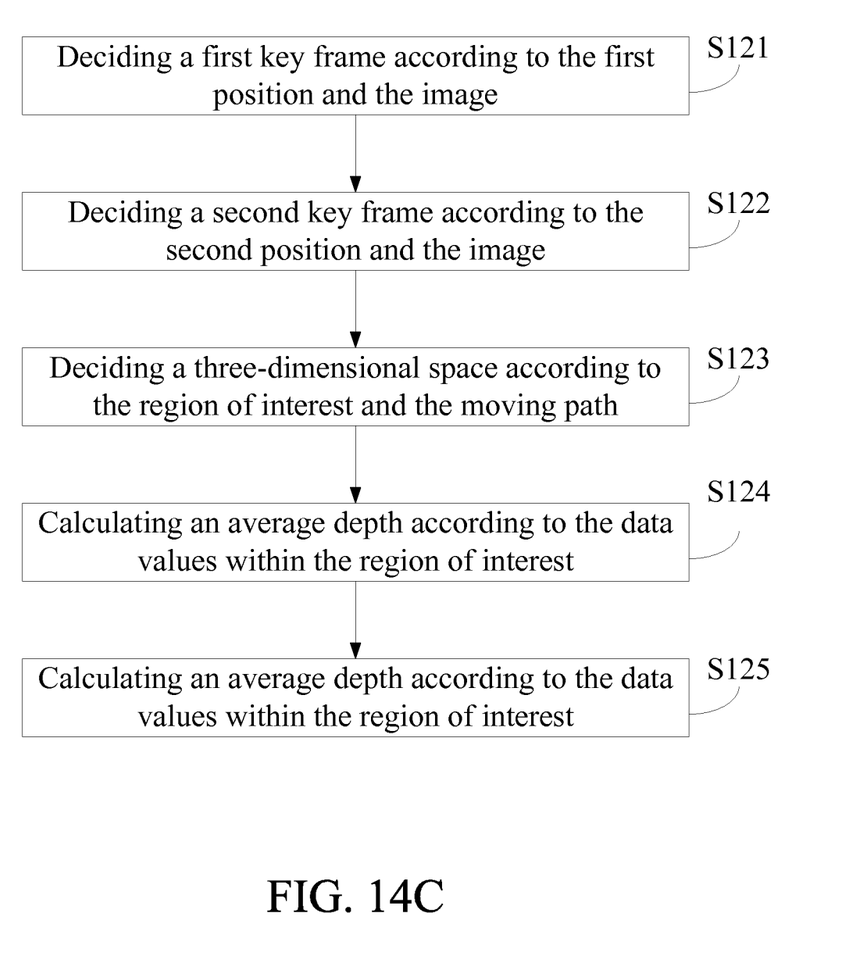

A second embodiment of the present invention is a computer-implemented method for generating a three-dimensional scene, whose flowchart is illustrated in FIGS. 14A, 14B, and 14C. The method may be executed by an electronic apparatus, such as the apparatus described in the first embodiment.

First, step S101 is executed for generating a depth histogram according to a plurality of depth data of an image. Next, step S103 is executed for generating a region of interest of the image according to the depth histogram. Following that, step S105 is executed for deciding a moving path of a virtual camera according to the region of interest. Finally, step S107 is executed for generating the three-dimensional scene according to the image and the moving path.

It is noted that the step S103 may be achieved by the steps illustrated in FIG. 14B in some other embodiments. To be more specific, each of the depth data is of a depth value, each of the depth data corresponds to a portion of the image, and the depth histogram generated in step S101 records an accumulated number of each of the depth values.

To generate the region of interest of the image, step S111 is executed for figuring out a maximum value among the accumulated number. Next, step S112 is executed for deciding a first threshold according to the maximum value. For example, the first threshold may be a value equivalent to a certain percentage of the maximum value. Following that, step S113 is executed for updating the depth histogram by truncating the accumulated numbers according to the threshold. The purpose for executing the steps S111 to S113 is removing noises in the depth histogram generated in the step S101. Nevertheless, in some other embodiments, the steps S111 to S113 may be omitted.

Next, step S114 is executed for updating the depth histogram by filtering out the accumulated numbers corresponding to the depth values greater than a second threshold, wherein the second threshold is a middle value between a maximum depth value and a minimum depth value among the depth values. For example, the second threshold TH2 may be a median value or a central value of the depth values covered by the depth histogram derived in the step S113 or in the step S111 (for the situation that the steps S111 to S113 are omitted).

Following that, step S115 is executed for deciding a depth range according to the depth histogram updated in the step S114. In some other embodiments, the step S115 may comprise a step for calculating a mean value and a standard deviation according to the depth values remained in the updated depth histogram (not shown) and a step for calculating the depth range according to the mean value and the standard deviation (not shown). For those embodiments, the depth range may be from a value equivalent to the mean value minus the standard deviation to a value equivalent to the mean value plus the standard deviation.

Afterwards, step S116 and step S117 are executed for respectively deciding a horizontal range and a vertical range according to a depth map and the depth range. The present invention does not limit the order for executing the steps S116 and S117. The depth map comprises the depth data; more specifically, the depth data are arranged in the depth map in a way that the depth map corresponds to the image 10 in terms of spatial positions. In some other embodiments, the step S116 may comprise a step for deriving a horizontal projection by projecting the depth data of the depth map within the depth range onto a horizontal axis (not shown) and calculating the horizontal range according to the horizontal projection (not shown). For example, the method may calculate a mean value and a standard deviation of the horizontal projection and calculate the horizontal range according to the mean value and the standard deviation. Similarly, in some other embodiments, the step S117 may comprise a step for deriving a vertical projection by projecting the depth data of the depth map within the depth range onto a vertical axis (not shown) and calculating the vertical range according to the vertical projection (not shown). For example, the method may calculate a mean value and a standard deviation of the vertical projection and calculate the vertical range according to the mean value and the standard deviation.

Next, step S118 is executed for deciding the region of interest of the image according to the horizontal range and the vertical range. An area of the depth map that is within the range of the vertical range and the horizontal range may be decided to be the region of interest of the depth map. When the resolutions of the depth map and the image are the same, the step S118 treats the region of interest as the one for the image. When the resolutions of the depth map and the image are not the same, the step S118 will scale the region of interest of the depth map for the image. After the execution of the step S118, the step S103 has been completed.

As mentioned, after the region of interest of the image has been generated in the step S103, the step S105 will be executed for deciding the moving path of the virtual camera. It can be decided according to a size of the region of interest, an aspect ratio of the region of interest, and/or a center of the region of interest. In some other embodiments, the step S105 may comprise a step for deciding an index according to the size of the region of interest, the aspect ratio of the region of interest, and/or the center of the region of interest (not shown) and a step for selecting the moving path from a plurality of predetermined moving paths according to the index (not shown).

As mentioned, after the moving path has been decided in the step S105, the step S107 will be executed for generating the three-dimensional scene accordingly. In some other embodiments, the step S107 may be achieved by the steps illustrated in FIG. 14C. The moving path defines a first position of a camera view and a second position of the camera view. Step S121 is executed for deciding a first key frame according to the first position and the image, while step S122 is executed for deciding a second key frame according to the second position and the image. It is noted that the present invention does not limit the order for executing the steps S121 and S122. The three-dimensional scene comprises the first key frame and the second key frame in sequence.

Steps S123 to S125 may be further executed for some other embodiments. Step S123 is executed for deciding a three-dimensional space according to the region of interest and the moving path. Next, step S124 is executed for calculating an average depth according to the data values within the region of interest. Following that, step S125 is executed for calculating a size of a particle type for the three-dimensional space according to the average depth. In this way, the three-dimensional scene comprises the first key frame, the second key frame, and the particles of the particle type in appropriate size(s).

If the electronic apparatus executing the method comprises a display unit or is connected to a display unit, the method may further execute a step for displaying the first key frame and the second key frame in sequence (not shown) and a step for displaying a plurality of particles of the size in the three-dimensional space (not shown).

In addition to the aforesaid steps, the second embodiment can execute all the operations and functions set forth for the apparatus 1 in the first embodiment. How the second embodiment executes these operations and functions will be readily appreciated by those of ordinary skill in the art based on the explanation of the first embodiment, and thus will not be further described therein.

The computer-implemented method for generating a three-dimensional scene of the second embodiment may be implemented by a computer program which is stored in a non-transitory tangible machine-readable medium. When the computer program is loaded into an electronic apparatus, a plurality of codes comprised in the computer program will be executed by the electronic apparatus to accomplish all the steps described in the second embodiment. This non-transitory tangible machine-readable medium may be a common electronic device, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above description, the apparatus and computer-implemented method for generating a three-dimensional scene and non-transitory tangible computer readable medium thereof of the present invention is able to generate a three-dimensional scene having parallax effects by using an image and its corresponding depth data. There are two key factors for introducing the parallax effects to the three-dimensional scene. First, the key frames comprised in the three-dimensional scene are taken from various positions along the moving path which traverses along at least one direction (i.e. x-direction, y-direction, and/or z-direction). Second, particles of appropriate sizes are added into the three-dimensional scene. With the parallax effects, the three-dimensional scene has three-dimensional feeling to human eyes.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for generating a three-dimensional scene, comprising:
a storage unit, being stored with an image, a plurality of depth data of the image, and a plurality of predetermined moving paths; and
a processing unit, being electrically connected to the storage unit and configured to generate a depth histogram according to the depth data, generate a region of interest of the image according to the depth histogram, and decide a moving path of a virtual camera according to the region of interest by performing the following operations:
deciding an index according to one of a size of the region of interest, an aspect ratio of the region of interest, a center of the region of interest, and a combination thereof, and
selecting the moving path from the predetermined moving paths according to the index,
wherein the processing unit is further configured to generate the three-dimensional scene according to the image and the moving path.

2. The apparatus for generating the three-dimensional scene of claim 1, wherein each of the depth data is of a depth value, each of the depth data corresponds to a portion of the image, a depth map comprises the depth data, the depth histogram records an accumulated number of each of the depth values, and the processing unit generates the region of interest by performing the following operations:
updating the depth histogram by filtering out the accumulated numbers corresponding to the depth values greater than a first threshold, wherein the first threshold is a middle value between a maximum depth value and a minimum depth value among the depth values;
deciding a depth range according to the updated depth histogram;
deciding a horizontal range according to the depth map and the depth range;
deciding a vertical range according to the depth map and the depth range; and
deciding the region of interest of the image according to the horizontal range and the vertical range.

3. The apparatus for generating the three-dimensional scene of claim 1, wherein the moving path defines a first position of a camera view and a second position of the camera view, and the processing unit generates the three-dimensional scene by performing the following operations:
deciding a first key frame according to the first position and the image; and
deciding a second key frame according to the second position and the image.

4. The apparatus for generating the three-dimensional scene of claim 3, wherein the processing unit generates the three-dimensional scene by performing the following operations:
deciding a three-dimensional space according to the region of interest and the moving path;
calculating an average depth according to the data values within the region of interest;
calculating a size of a particle type for the three-dimensional space according to the average depth.

5. The apparatus for generating the three-dimensional scene of claim 4, further comprising:
a displaying unit, being electrically connected to the processing unit and configured to display the first key frame and the second key frame in sequence and display a plurality of particles of the size in the three-dimensional space,
wherein the particles are of the particle type.

6. A computer-implemented method for generating a three-dimensional scene, comprising the following steps of:
generating a depth histogram according to a plurality of depth data of an image;
generating a region of interest of the image according to the depth histogram;

deciding a moving path of a virtual camera according to the region of interest, comprising the following steps:
   deciding an index according to one of a size of the region of interest, an aspect ratio of the region of interest, a center of the region of interest, and a combination thereof, and
   selecting the moving path from a plurality of predetermined moving paths according to the index; and
generating the three-dimensional scene according to the image and the moving path.

7. The computer-implemented method of claim 6 wherein each of the depth data is of a depth value, each of the depth data corresponds to a portion of the image, a depth map comprises the depth data, the depth histogram records an accumulated number of each of the depth values, and the step of generating the region of interest comprises the steps of:
   updating the depth histogram by filtering out the accumulated numbers corresponding to the depth values greater than a first threshold, wherein the first threshold is a middle value between a maximum depth value and a minimum depth value among the depth values;
   deciding a depth range according to the updated depth histogram;
   deciding a horizontal range according to the depth map and the depth range;
   deciding a vertical range according to the depth map and the depth range; and
   deciding the region of interest of the image according to the horizontal range and the vertical range.

8. The computer implemented method of claim 6, wherein the moving path defines a first position of a camera view and a second position of the camera view, and the step of generating the three-dimensional scene comprises the steps of:
   deciding a first key frame according to the first position and the image; and
   deciding a second key frame according to the second position and the image.

9. The computer implemented method of claim 8, wherein the step of generating the three-dimensional scene further comprises the steps of:
   deciding a three-dimensional space according to the region of interest and the moving path;
   calculating an average depth according to the data values within the region of interest;
   calculating a size of a particle type for the three-dimensional space according to the average depth.

10. The computer implemented method of claim 9, further comprising the step of:
   displaying the first key frame and the second key frame in sequence; and
   displaying a plurality of particles of the size in the three-dimensional space, wherein the particles are of the particle type.

11. A non-transitory tangible computer readable medium, being stored with a computer program, the computer program executing a method for generating a three-dimensional scene after being loaded into an electronic apparatus, and the method for generating the three-dimensional scene comprising the following steps:
   generating a depth histogram according to a plurality of depth data of an image;
   generating a region of interest of the image according to the depth histogram;
   deciding a moving path of a virtual camera according to the region of interest, comprising the following steps:
      deciding an index according to one of a size of the region of interest, an aspect ratio of the region of interest, a center of the region of interest, and a combination thereof, and
      selecting the moving path from a plurality of predetermined moving paths according to the index; and
   generating the three-dimensional scene according to the image and the moving path.

* * * * *